United States Patent [19]
Katsuo

[11] Patent Number: 5,616,676
[45] Date of Patent: Apr. 1, 1997

[54] THERMOSETTING POLYURETHANE-UREA ELASTIC YARN AND PROCESS THEREOF

[75] Inventor: Kenichi Katsuo, Tsuruga, Japan

[73] Assignee: Toyo Boseki Kabushiki Kaisha, Okaka, Japan

[21] Appl. No.: 544,896

[22] Filed: Oct. 18, 1995

[30] Foreign Application Priority Data

Oct. 19, 1994 [JP] Japan ............................ 6-253518

[51] Int. Cl.$^6$ .............................. D01F 6/70; D01F 6/72; C08G 18/10; C08G 18/32
[52] U.S. Cl. ............................ 528/61; 528/906; 264/205
[58] Field of Search ........................ 528/61, 906; 264/205

[56] References Cited

U.S. PATENT DOCUMENTS

| | | | |
|---|---|---|---|
| 3,557,044 | 1/1971 | Bleasdale et al. | 524/874 |
| 4,973,647 | 11/1990 | Bretches et al. | 528/61 |
| 5,362,432 | 11/1994 | Houser et al. | 264/205 |

FOREIGN PATENT DOCUMENTS 04-100919  4/1992  Japan.

*Primary Examiner*—Thomas Hamilton, III
*Attorney, Agent, or Firm*—Fish & Neave

[57] ABSTRACT

A thermosetting polyurethane-urea elastic yarn having a thermosetting ratio of 45–65%, which is obtained by reacting a polyglycol which has a number average molecular weight of 600–6,000 and which has hydroxy at both terminals, with a molar excess of a diisocyanate compound to give an isocyanate-terminated polymeric intermediate, reacting the isocyanate-terminated polymeric intermediate with a diamine compound to give a segmented polyurethane-urea elastomer, and subjecting the obtained elastomer to a spinning step. The thermosetting polyurethane-urea elastic yarn of the present invention has superior mechanical properties and high thermosetting ratios. When applied to knit fabric, particularly to thin knit fabric for panty hose, superior appearance of the knit fabric can be achieved.

8 Claims, 1 Drawing Sheet

THERMOSETTING POLYURETHANE-UREA ELASTIC YARN AND PROCESS THEREOF

FIELD OF THE INVENTION

The present invention relates to a polyurethane-urea elastic yarn having improved thermosetting property, particularly an elastic yarn for panty hose, and process thereof.

BACKGROUND OF THE INVENTION

There has been conventionally known a linear segmented polyurethane-urea elastomer manufactured by reacting a diamine compound or a mixture of a diamine compound and a secondary monoamine, with a polymeric intermediate (U.S. Pat. No. 3,557,044).

U.S. Pat. No. 3,557,044 disclosed manufacture of polyurethane-urea elastomer comprising reacting a diamine compound and a secondary monoamine with a polymeric intermediate. However, this patent does not pay attention to the thermosetting ratio as taught in the present invention, but intends to obtain a polyurethane-urea elastic yarn having superior mechanical properties even from polymers having low viscosities.

The conventional polyurethane elastic yarns include, for example, a polyurethane elastic yarn obtained by using a diol as a chain extender for a polymeric intermediate and a polyurethane-urea elastic yarn obtained by using a diamine as a chain extender for a polymeric intermediate. While the former generally shows 70% or more of a thermosetting ratio and is superior from this aspect, it is inferior in mechanical properties such as tensile recovery under heating and elongation. In contrast, the latter is generally superior in mechanical properties such as tensile recovery under heating and elongation, whereas it shows low thermosetting ratio.

A well-known use of the polyurethane elastic yarn is for panty hose, for which polyurethane-urea elastic yarns obtained by dry spinning polyurethane-urea elastomers having been frequently used. In recent years, elastic yarns have been increasingly used for forming the leg part of panty hoses. As mentioned above, however, polyurethane-urea elastic yarn has a low thermosetting ratio, which causes disturbance in knit fabric caused during a setting step in panty hose manufacture to result in defective appearance of the product. To avoid this, a polyurethane elastic yarn has been used which is manufactured using a diol for chain-extending a polymeric intermediate. Yet, such polyurethane elastic yarn has insufficient mechanical properties such as tensile recovery under heating.

SUMMARY OF THE INVENTION

Accordingly, the present invention aims at providing a polyurethane-urea elastic yarn superior in mechanical properties and having a high thermosetting ratio.

Another object of the present invention is to provide a method for manufacturing the above-mentioned superior polyurethane-urea elastic yarn.

The above-mentioned object can be accomplished by a thermosetting polyurethane-urea elastic yarn having a thermosetting ratio of 45–65%, which is obtained by reacting a polyglycol which has a number average molecular weight of 600–6,000 and which has hydroxy at both terminals, with a molar excess of a diisocyanate compound to give an isocyanate-terminated polymeric intermediate, reacting the isocyanate-terminated polymeric intermediate with a diamine compound to give a segmented polyurethane-urea elastomer, and subjecting the obtained elastomer to a spinning step.

The present invention also provides, in a process for manufacture of a thermosetting polyurethane-urea elastic yarn comprising reacting a polyglycol which has a number average molecular weight of 600–6,000 and which has hydroxy at both terminals, with a molar excess of a diisocyanate compound to give an isocyanate-terminated polymeric intermediate, reacting the isocyanate-terminated polymeric intermediate with a mixture of a diamine compound and a secondary monoamine compound to give a segmented polyurethane-urea elastomer, and spinning the obtained elastomer, the improvement which comprises reacting the polymeric intermediate, the diamine compound and the secondary monoamine compound in amounts such that A and R to be mentioned below fall in the area enclosed by the lines of the following four equations, to give a polyurethane-urea elastic yarn having a thermosetting ratio of 45–65%:

$$A = 1.09R - 0.98 \quad (1)$$

$$A = -0.19R + 0.19 \quad (2)$$

$$A = 1.10R - 0.92 \quad (3)$$

$$A = -0.37R + 0.37 \quad (4)$$

wherein A is an equivalent ratio of the diamine compound and the secondary monoamine compound to be reacted, which is obtained by the following formula (5)

$$A = MA/(DA+MA) \quad (5)$$

wherein MA is an amine equivalent of the secondary monoamine compound to be reacted, DA is an amine equivalent of the diamine compound to be reacted, and R is a ratio of an isocyanate (free) equivalent of the polymeric intermediate to the total amine equivalent of the compounds to be reacted, which is obtained by the following formula (6)

$$R = I/(DA+MA) \quad (6)$$

wherein I is a free isocyanate equivalent of the polymeric intermediate and DA and MA are as defined in (5).

DETAILED DESCRIPTION OF THE INVENTION

Figure 1:
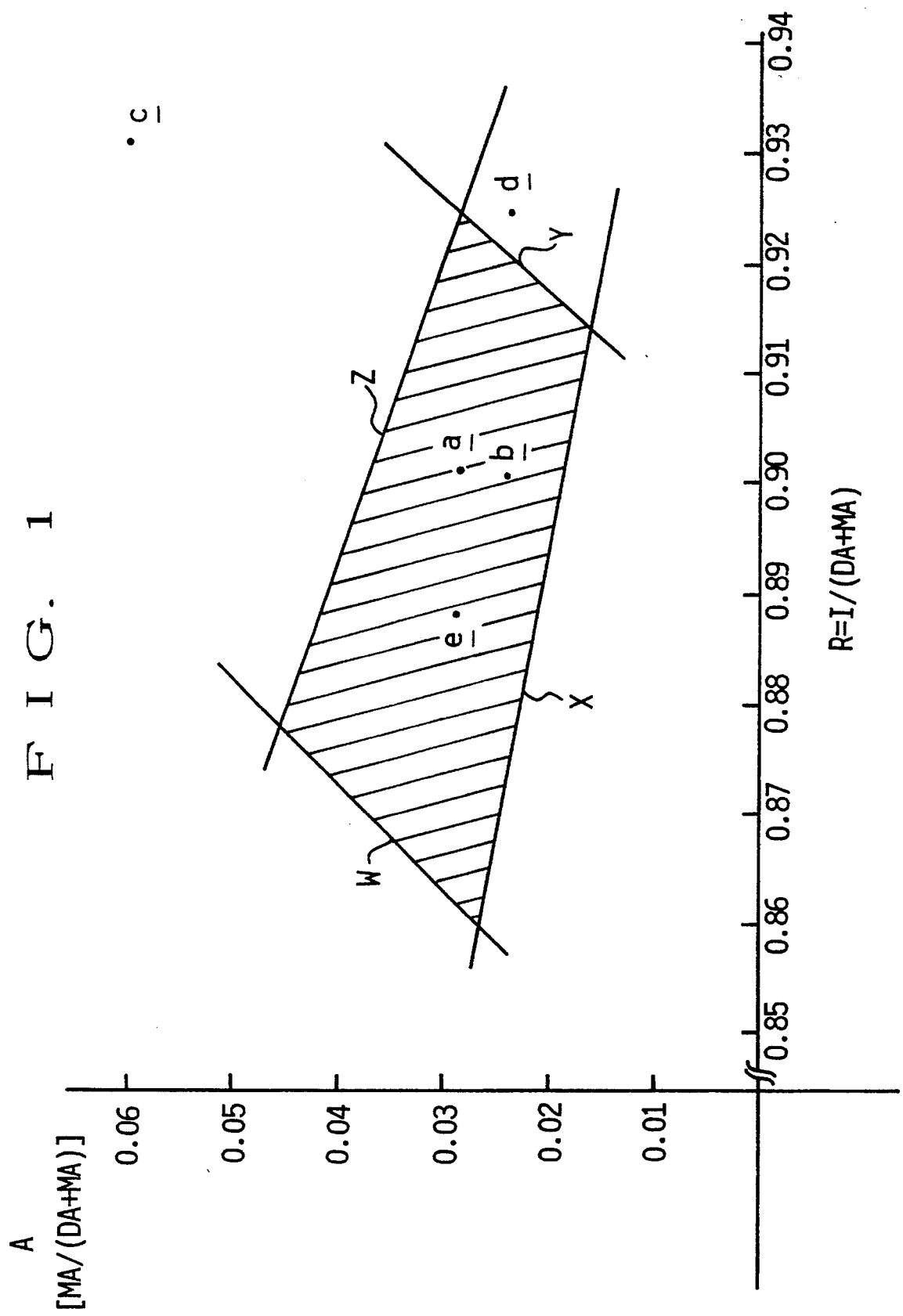
FIG. 1 shows the area enclosed by the lines of the equations (1) to (4).

There has not been known a polyurethane-urea elastic yarn having a thermosetting ratio of 45–65%, which is obtained using a conventional diamine compound (e.g. ethyleneamine, 1,2-diaminopropane or combinations thereof) as a chain extender.

The elastic yarn of the present invention can be obtained by a process comprising, in a process for preparing a segmented polyurethane-urea elastomer by reacting a mixture of a diamine compound and a secondary monoamine compound with an isocyanate-terminated polymeric intermediate obtained by reacting a polyglycol which has a number average molecular weight of 600–6,000 and which has hydroxy at both terminal groups, with a molar excess of a diisocyanate compound, a process which comprises reacting the polymeric intermediate, the diamine compound and the secondary monoamine compound in a ratio specified above and spinning the obtained polyurethane-urea elastomer.

The thermosetting polyurethane-urea elastic yarn of the present invention can be prepared by other processes as well. However, a preferred process from the aspects of stability during spinning and the like is the above-mentioned process.

The area enclosed by the lines of the above-mentioned equations (4) to (4) in the present invention is hatched in FIG. 1, wherein line W is drawn according to the equation (1), line X is drawn according to the equation (2), line Y is drawn according to the equation (3), and line Z is drawn according to the equation (4). In the Figure, the points a and b respectively correspond to A and R of Examples 1 and 3, and the points c and d respectively correspond to A and R of Comparative Examples 1 and 2.

A and R can be calculated as in the following.

A polymeric intermediate is obtained by reacting a polytetramethylene glycol (9,000 parts by weight) having a number average molecular weight of 1,800 and 4,4'-diphenylmethanediisocyanate (2,125 parts by weight). The isocyanate (free) equivalent of the obtained polymeric intermediate is 10, since 9,000 parts by weight of polytetramethylene glycol having a number average molecular weight of 1,800 corresponds to 5 mols. The 4,4'-diphenylmethanediisocyanate (2,125 parts by weight) is 8.5 mols and equals to 17 equivalents. Therefore, the isocyanate (free) equivalent I of the polymeric intermediate is calculated by: 17−10=7.

The polymeric intermediate is reacted with ethylenediamine (DA) (230 parts by weight, 3.83 mols=7.66 equivalents) and diethylamine (MA) (17.3 parts by weight, 0.23 mol=0.23 equivalent) for chain extension.

Consequently, R=I/(DA+MA) is 7/(7.66+0.23)=0.887 and A=MA/(DA+MA) is 0.23/(7.66+0.23)=0.029, and these values designate the point expressed in FIG. 1 with a reference symbol e.

In the process of the present invention, it is essential that the equivalent ratio of the diamine compound and the secondary monoamine compound:

$$MA/(DA+MA)$$

wherein each symbol is as defined above, namely A, and the equivalent ratio of the isocyanate (free) in the polymeric intermediate to the total amine equivalents:

$$I/(DA+MA)$$

wherein each symbol is as defined above, namely R, simultaneously exist in the area enclosed by the lines of the above-mentioned equations (1) to (4), which area being hatched in FIG. 1. It is when the ratios of the polymeric intermediate, diamine compound and secondary monoamine compound to be used are adjusted to meet this requirement that a polyurethane-urea elastic yarn having a thermosetting ratio of 45–65% can be obtained.

The polyglycol to be used in the present invention includes, for example, polyester glycol and polyalkylene glycol. Examples of the polyester glycol include those obtained by condensation polymerization of an organic dibasic acid such as succinic acid and adipic acid, and an organic glycol such as ethylene glycol, propylene glycol, butanediol and hexanediol. Examples of the polyalkylene glycol include polyethylene glycol, polypropylene glycol and polytetramethylene glycol.

The number average molecular weight of these polyglycols is 600–6,000, preferably 1,000–3,000. When said molecular weight is less than 600, the elongation of the obtained elastic yarn is insufficient, and when it exceeds 6,000, the yarn shows insufficient mechanical properties such as strength and tensile recovery under heating.

Of these polyglycols, particularly preferred is a polytetramethylene glycol having a number average molecular weight of 1,000 to 3,000.

The diisocyanate compound to be used in the present invention includes, for example, p,p'-diphenylmethanediisocyanate (4,4'-diphenylmethanediisocyanate), 2,4-toluenediisocyanate, 1,4-phenylenediisocyanate and 4,4'-dicyclohexylmethanediisocyanate, with preference given to p,p'-diphenylmethanediisocyanate (4,4'-diphenylmethanediisocyanate).

The reaction between polyglycol and diisocyanate compound is conducted using a molar excess of diisocyanate compound, preferably using amounts such that the ratio of isocyanate to hydroxy is from 1.3 to 2.6.

The diamine compound to be used as a chain extender in the present invention is not particularly limited and exemplified by ethylenediamine and 1,2-propylenediamine. Preferred is a sole or a combined use of diamine.

The diamine compound to be used in the present invention may be mixed with a secondary monoamine. Preferable examples of the secondary monoamine to be used concurrently include N,N-diethylamine (diethylamine), N,N-diisopropylamine and N-ethyl-N-isopropylamine.

The solvent to be used in the present invention is preferably a polar solvent such as N,N-dimethylformamide, N,N-dimethylacetamide, N,N,N',N'-tetramethylurea, N-methylpyrrolidone and dimethyl sulfoxide.

An antioxidant, an ultraviolet absorber, a pigment and a tertiary amine may be added as necessary to an elastomer solution obtained.

The elastomer solution (polymer solution) obtained is dry spun by a conventional method, false-twisted in the case of multifilament, applied with an oil, and wound up.

The elastic yarn thus wound up is subjected to a heat treatment as necessary, in the state of a cheese (wound-up state) using a heating device such as high temperature steam bath.

The elastic yarn of the present invention is capable of providing most superior appearance, namely, good finishing, of, for example, a panty hose particularly when it has a denier of 5–40, or it is a monofilament.

The elastic yarn obtained is generally subjected to a covering step in which nylon filaments or polyester filaments are wound therearound. The processed filament-covered yarn is fed to a knitting step to provide a knit fabric for panty hose and the like.

The knit fabric for panty hose and the like is sewn, dyed and finished with steam heat etc. (heat setting) to give a final product such as a panty hose.

The elastic yarn having an improved thermosetting property of the present invention affords fine appearance of the knitted fabric, particularly when the fabric is thin such as that for panty hose.

The evaluation of thermosetting ratio of the elastic yarn is performed as follows.

An elastic yarn is applied with an initial load (g) (the load being 1/1,000 of the figure of denier of the yarn) to straighten the yarn without forcible stretching, and the yarn is marked at 20 mm intervals ($L_0$). The elastic yarn is set on a fixed frame and stretched to the extent that the marks are located at 40 mm intervals, at which point the yarn is fixed. The yarn is then placed in a vessel to be filled with water and sealed. The temperature thereof is elevated to 105° C. over one hour and the yarn is allowed to stand at 105° C. for one hour. The vessel is cooled to room temperature over one hour. Then, the frame is taken out and the yarn is thoroughly dried at room temperature. The yarn is taken away from the frame and applied with a load (g) (the load being 1/1,000 of the figure of denier of the yarn) to straighten the yarn without forcible stretching, and the distance ($L_1$) mm between the markers is measured.

The thermosetting ratio is calculated from the following equation using the values $L_0$ (20 mm) and $L_1$.

Thermosetting ratio (%)=[($L_1$−$L_0$)/$L_0$]×100

A thermosetting ratio of 0% means absence of thermosetting and inferiority of an elastic yarn in the thermosetting property. A thermosetting ratio of 100% means that the elastic yarn is completely set by heat.

In order to obtain a panty hose having good appearance of the knit fabric, a thermosetting ratio of the elastic yarn to be used of not less than 45% has been confirmed to be necessary. The thermosetting ratio of the elastic yarn of the present invention is not less than 45% and not more than 65%, and the preferred range is from not less than 50% to not more than 60%. When the thermosetting ratio of the elastic yarn is less than 45%, the appearance of the knit fabric becomes defective and the shape of the product (panty hose), too, becomes poor. When the thermosetting ratio exceeds 65%, the stability during spinning is impaired to often cause broken thread and the like.

According to the present invention, a polyurethane-urea elastic yarn having a superior thermosetting ratio of not less than 45% can be provided using, as a chain extender for a polymeric intermediate, an economically advantageous diamine conventionally used, such as ethylenediamine and 1,2-diaminopropane, without the use of a special diamine, while maintaining the superior mechanical properties of polyurethane-urea elastic yarn in terms of elongation and tensile recovery under heating. The polyurethane-urea elastic yarn having a superior thermosetting ratio of the present invention can provide a panty hose capable of satisfying good appearance and superior mechanical properties in terms of elongation and tensile recovery under heating, particularly when it is used for forming the leg part thereof.

When using for forming the leg part of a panty hose, the characteristic of the elastic yarn of the present invention can be effectively shown when the yarn is thin and has a denier of not more than 40, particularly when it is a thin monofilament having a denier of not more than 40.

The present invention is explained in more detail by illustrative Examples in the following, to which the invention is not limited.

EXAMPLE 1

A polytetramethylene glycol (9,000 parts by weight) having a number average molecular weight of 1,800 and 4,4'-diphenylmethane diisocyanate (2,125 parts by weight) were weighed and placed in a polymerization vessel. The mixture was heated to 70° C. with thorough stirring. The mixture was heated for 100 minutes and N,N-dimethylacetamide (17,000 parts by weight) was added. The reaction mixture was cooled with stirring, thereby dissolving the mixture to give a polymeric intermediate solution.

The polymeric intermediate solution was kept at about 12° C.

Separately, a solution of ethylenediamine (300 parts by weight) dissolved in N,N-dimethylacetamide (5,700 parts by weight) and a solution of N,N-diethylamine (100 parts by weight) dissolved in N,N-dimethylacetamide (4,900 parts by weight) were individually prepared.

The ethylenediamine solution (1,113 parts by weight per hour), the N,N-diethylamine solution (201 parts by weight per hour) and the polymeric intermediate solution (6,911 parts by weight per hour) were supplied into a mixer rotating at high speed, and passed therethrough at an average resident time of 10 seconds and jacket temperature of 20° C. The reaction mixture was supplied into a tank equipped with an agitation element and reacted at 20° C. for 20 minutes.

The obtained solution of polyurethane-urea elastomer had a viscosity, by means of rotating-viscometer, of 2,760 poise at 30° C. The values of A and R designate the point expressed in FIG. 1 with a reference symbol a.

The solution of polyurethane-urea elastomer was supplied to a spinneret having two capillaries at 3.93 g/min and extruded therefrom. The extruded elastomer was passed through a spinning tube, through which a hot gas was flown, to evaporate the solvent (N,N-dimethylacetamide). The dried filament was passed through a false-twister, in which a circling air was generated, to impart the yarn a false twist, and the yarn was brought into contact with an oiling roller to apply an oil. The oil consisted of magnesium stearate (2 parts) and dimethylsiloxane (98 parts, 10 cts/20° C.). The elastic yarn applied with the oil was wound up on a bobbin at 600 m/m, whereby a cheese of elastic yarn (400 g) having a denier (d) of 20 was obtained. The elastic yarn had a strength of 1.4 g/denier, elongation [{(length of yarn stretched-original length)/(original length)−1}×100 (%)] of 470% and thermosetting ratio of 51%.

The obtained elastic yarn cheese was fed to a covering machine and polyamide filaments (10 d/5 f) were wound therearound at a total draft of 3.2 fold and twisting number of 2,000 T/m to give a covered yarn consisting of an elastic yarn and a polyamide filament covering. Using this covered yarn alone, the leg part of panty hose was knitted and a panty hose was manufactured by a known method. According to a known method, the manufactured panty hose was finished, dyed, fit in a mold, and thermoset using a saturated steam at 110° C. for 30 seconds. The panty hose after the setting was visually observed and found to have good appearance with no disturbance or irregularity in the knit fabric and no defects in the shape.

EXAMPLE 2

In the same manner as in the above Example except that the extrusion output was set to 2.6 g/min, a spinneret having one capillary was used, no false twisting was applied and the yarn was wound up at 500 m/min, a monofilament of 15 denier was obtained. A panty hose was manufactured in the same manner as above. The panty hose after setting was visually observed and found to have better appearance than the aforementioned one manufactured using a false-twisted yarn, with no disturbance or irregularity in the knit fabric and no defects in the shape.

COMPARATIVE EXAMPLE 1

In the same manner as in Example 1 except that an ethylenediamine solution was supplied at 1,037 parts by weight per hour and a diethylamine solution was supplied at 426 parts by weight per hour, an elastomer solution was obtained.

The obtained solution of polyurethane-urea elastomer had a viscosity of 2,410 poise at 30° C. The values of A and R designate the point expressed in FIG. 1 with a reference symbol c.

A cheese of 20 denier (d) elastic yarn was obtained by dry spinning as in Example 1.

This elastic yarn had a strength of 1.3 g/denier, an elongation of 460% and a thermosetting ratio of 34%.

COMPARATIVE EXAMPLE 2

In the same manner as in Example 1 except that an ethylenediamine solution was supplied at 1,116 parts by weight per hour and a diethylamine solution was supplied at 163 parts by weight per hour, an elastomer solution was obtained.

The obtained solution of polyurethane-urea had a viscosity of 2,870 poise at 30° C. The values of A and R designate the point expressed in FIG. 1 with a reference symbol d.

A cheese of 20 denier (d) elastic yarn was obtained by dry spinning as in Example 1.

This elastic yarn had a strength of 1.2 g/denier, an elongation of 430% and a thermosetting ratio of 68%. The yarn ran unstably in a spinning tube and thread swing and broken thread frequently occurred.

EXAMPLE 3

A polytetramethylene glycol (10,000 parts by weight) having a number average molecular weight of 2,000 and 4,4'-diphenylmethane diisocyanate (2,250 parts by weight) were weighed and placed in a polymerization vessel. They were heated to 70° C. with thorough stirring. The mixture was heated for 70 minutes and N,N-dimethylacetamide (18,500 parts by weight) was added. The reaction mixture was cooled with stirring, thereby dissolving the mixture to give a polymeric intermediate solution.

The polymeric intermediate solution was kept at about 12° C.

Separately, a solution of ethylenediamine (195 parts by weight), 1,2-diaminopropane (103 parts by weight) dissolved in N,N-dimethylacetamide (5,660 parts by weight) and a solution of N,N-diethylamine (100 parts by weight) dissolved in N,N-dimethylacetamide (4,900 parts by weight) were individually prepared.

The diamine solution (1,194 parts by weight per hour), the N,N-diethylamine solution (166 parts by weight per hour) and the polymeric intermediate solution (6,610 parts by weight per hour) were supplied into a mixer rotating at high speed, and passed therethrough under the same conditions as in Example 1. The reaction mixture was supplied to a tank equipped with an agitation element and reacted at 20° C. for 20 minutes.

The obtained solution of polyurethane-urea elastomer had a viscosity of 2,970 poise at 30° C. The values of A and R designate the point expressed in FIG. 1 with a reference symbol b.

1,3,5-tris(4-t-Butyl-3-hydroxy-2,6-dimethylbenzyl)isocyanuric acid (50 parts by weight) and a 50% by weight solution (300 parts by weight) of a polymer of 3-ethyl-1,5-dimethyl-3-azapentane-1,5-diol and 4,4'-dicyclohexylmethane diisocyanate in N,N-dimethylacetamide were added to the solution of polyurethane-urea elastomer, and the mixture was stirred for 70 minutes.

The obtained solution was supplied to a spinneret having two capillaries at 3.88 g/min, and an elastic yarn was obtained in the same manner as in Example 1.

The elastic yarn had a strength of 1.5 g/denier, an elongation of 430% and a thermosetting ratio of 58%.

The obtained elastic yarn cheese was processed in the same manner as in Example 1 and a panty hose was manufactured therefrom. The evaluation results of the panty hose are shown in Table 1 along with the results of the panty hose of Comparative Example 1.

TABLE 1

| Evaluation item | Example 1 | Example 2 | Example 3 | Comparative Example 1 | Comparative Example 2 |
|---|---|---|---|---|---|
| Stability in spinning [1] | O | O | O | O | X |
| Thermosetting ratio (%) [2] | 51 | 59 | 58 | 34 | 68 |
| Fleck in leg part [3] | O | O | O | X | O |

Note:
[1] : evaluation in terms of thread swing and breakage
[2] : wet heat setting at 105° C.
[3] : visually observed Evaluation:
Stability in spinning
  O: absence of thread swing and breakage
  X: presence of thread swing, breakage or combination thereof Fleck in knit fabric
  O: smooth and no defective appearance
  X: irregular or defective appearance

What is claimed is:
1. A thermosetting polyurethane-urea elastic yarn having a thermosetting ratio of 45–65%, which is obtained by reacting a polyglycol which has a number average molecular weight of 600–6,000 and which has hydroxy at both terminals, with a molar excess of a diisocyanate compound to give an isocyanate-terminated polymeric intermediate, reacting the isocyanate-terminated polymeric intermediate with a diamine compound to give a segmented polyurethane-urea elastomer, and subjecting the obtained elastomer to a spinning step, wherein:

(a) the diamine compound is a mixture comprising a diamine compound and a secondary monoamine compound; and (b) the segmented polyurethane-urea elastomer is obtained by reacting the polymeric intermediate, the diamine compound and the secondary monoamine compound in amounts such that A and R in equations (1) through (4) below fall within the area enclosed by the lines of equations (1) through (4), giving a polyurethane-urea elastic yarn having a thermosetting ratio of 45–65%:

$$A = 1.09R - 0.98 \tag{1}$$

$$A = -0.19R + 0.19 \tag{2}$$

$$A = 1.10R - 0.92 \tag{3}$$

$$A = -0.37R + 0.37 \tag{4}$$

wherein A is an equivalent ratio of the diamine compound and the secondary monoamine compound to be reacted, which is obtained by equation (5):

$$A = MA/(DA + MA) \tag{5}$$

wherein MA is an amine equivalent of the secondary monoamine compound to be reacted, DA is an amine equivalent of the diamine compound to be reacted, and R is a ratio of an isocyanate (free) equivalent of the polymeric intermediate to the total amine equivalent of the compounds to be reacted, which is obtained by equation (6):

$$R=I/(DA+MA) \tag{6}$$

wherein I is a free isocyanate equivalent of the polymeric intermediate and DA and MA are as defined above.

2. The thermosetting polyurethane-urea elastic yarn of claim 1, wherein the diamine compound is at least one diamine selected from the group consisting of ethylenediamine and 1,2-diaminopropane.

3. The thermosetting polyurethane-urea elastic yarn of claim 1, wherein the elastic yarn is a monofilament.

4. The thermosetting polyurethane-urea elastic yarn of claim 1, wherein the elastic yarn is that for forming a panty hose.

5. In a process for manufacture of a thermosetting polyurethane-urea elastic yarn comprising reacting a polyglycol which has a number average molecular weight of 600–6,000 and which has hydroxy at both terminals, with a molar excess of a diisocyanate compound to give an isocyanate-terminated polymeric intermediate, reacting the isocyanate-terminated polymeric intermediate with a mixture of a diamine compound and a secondary monoamine compound to give a segmented polyurethane-urea elastomer, and spinning the obtained elastomer, the improvement which comprises reacting the polymeric intermediate, the diamine compound and the secondary monoamine compound in amounts such that A and R to be mentioned below fall in the area enclosed by the lines of the following four equations, to give a polyurethane-urea elastic yarn having a thermosetting ratio of 45–65%:

$$A=1.09R-0.98 \tag{1}$$

$$A=-0.19R+0.19 \tag{2}$$

$$A=1.10R-0.92 \tag{3}$$

$$A=-0.37R+0.37 \tag{4}$$

wherein A is an equivalent ratio of the diamine compound and the secondary monoamine compound to be reacted, which is obtained by the following formula (5)

$$A=MA/(DA+MA) \tag{5}$$

wherein MA is an amine equivalent of the secondary monoamine compound to be reacted, DA is an amine equivalent of the diamine compound to be reacted, and R is a ratio of an isocyanate (free) equivalent of the polymeric intermediate to the total amine equivalent of the compounds to be reacted, which is obtained by the following formula (6)

$$R=I/(DA+MA) \tag{6}$$

wherein I is a free isocyanate equivalent of the polymeric intermediate and DA and MA are as defined in (5).

6. The process for manufacturing a thermosetting polyurethane-urea elastic yarn of claim 5, wherein the diamine compound is at least one diamine selected from the group consisting of ethylenediamine and 1,2-diaminopropane.

7. The process for manufacturing a thermosetting polyurethane-urea elastic yarn of claim 5, wherein the elastic yarn is a monofilament.

8. The process for manufacturing a thermosetting polyurethane-urea elastic yarn of claim 5, wherein the elastic yarn is that for forming a panty hose.

* * * * *